United States Patent
Chen et al.

(10) Patent No.: US 12,066,985 B2
(45) Date of Patent: Aug. 20, 2024

(54) TOKEN-BASED OFFLOAD DATA TRANSFER WITH SYNCHRONOUS REPLICATION

(71) Applicant: EMC IP Holding Company LLC, Hopkinton, MA (US)

(72) Inventors: Xiangping Chen, Sherborn, MA (US); David Meiri, Somerville, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 167 days.

(21) Appl. No.: 16/864,272

(22) Filed: May 1, 2020

(65) Prior Publication Data
US 2021/0342307 A1 Nov. 4, 2021

(51) Int. Cl.
G06F 15/16 (2006.01)
G06F 11/07 (2006.01)
G06F 16/11 (2019.01)
G06F 16/13 (2019.01)
G06F 16/178 (2019.01)
G06F 16/182 (2019.01)

(52) U.S. Cl.
CPC ........ *G06F 16/184* (2019.01); *G06F 11/0772* (2013.01); *G06F 16/128* (2019.01); *G06F 16/137* (2019.01); *G06F 16/178* (2019.01); *G06F 16/1827* (2019.01)

(58) Field of Classification Search
None
See application file for complete search history.

(56) References Cited

U.S. PATENT DOCUMENTS

| | | |
|---|---|---|
| 6,141,743 A | 10/2000 | Strongin |
| 7,475,124 B2 | 1/2009 | Jiang et al. |
| 8,327,103 B1 | 12/2012 | Can et al. |
| 8,380,928 B1 | 2/2013 | Chen et al. |
| 8,429,346 B1 | 4/2013 | Chen et al. |
| 8,515,911 B1 | 8/2013 | Zhou et al. |
| 8,539,148 B1 | 9/2013 | Chen et al. |
| 8,566,483 B1 | 10/2013 | Chen et al. |

(Continued)

OTHER PUBLICATIONS

U.S. Appl. No. 15/499,943, filed Apr. 28, 2017, Kucherov et al.
(Continued)

*Primary Examiner* — Alex Gofman
*Assistant Examiner* — Shelly X Qian
(74) *Attorney, Agent, or Firm* — Daly, Crowley, Mofford & Durkee, LLP

(57) ABSTRACT

A method is provided, comprising: receiving, at a source system, a first copy instruction, the first copy instruction being associated with a token that represents one or more data items, the first copy instruction instructing the source system to copy the one or more data items from a first volume to a second volume; in response to the first copy instruction, retrieving one or more hash digests from a snapshot that is associated with the token, each of the one or more hash digests being associated with a different one of the one or more data items; and transmitting, to a target system, a second copy instruction that is associated with the one or more hash digests, the second copy instruction instructing the target system to copy the one or more data items to a replica of the second volume that is stored at the target system.

19 Claims, 6 Drawing Sheets

(56) References Cited

U.S. PATENT DOCUMENTS

| | | |
|---|---|---|
| 8,583,607 B1 | 11/2013 | Chen et al. |
| 8,600,943 B1 | 12/2013 | Fitzgerald et al. |
| 8,683,153 B1 | 3/2014 | Long et al. |
| 8,712,976 B1 | 4/2014 | Chen et al. |
| 8,775,388 B1 | 7/2014 | Chen et al. |
| 8,782,324 B1 | 7/2014 | Chen et al. |
| 8,799,601 B1 | 8/2014 | Chen et al. |
| 8,909,887 B1 | 12/2014 | Armangau et al. |
| 8,930,746 B1 | 1/2015 | Chen et al. |
| 8,954,699 B1 | 2/2015 | Chen et al. |
| 8,977,812 B1 | 3/2015 | Chen et al. |
| 9,009,437 B1 | 4/2015 | Bjornsson et al. |
| 9,152,336 B1 | 10/2015 | Chen et al. |
| 9,304,889 B1 | 4/2016 | Chen et al. |
| 9,305,009 B1* | 4/2016 | Bono .................. G06F 16/178 |
| 9,355,112 B1 | 5/2016 | Armangau et al. |
| 9,384,206 B1 | 7/2016 | Bono et al. |
| 9,395,937 B1 | 7/2016 | Si et al. |
| 9,449,011 B1 | 9/2016 | Chen et al. |
| 9,459,809 B1 | 10/2016 | Chen et al. |
| 9,460,102 B1 | 10/2016 | Bono et al. |
| 9,477,431 B1 | 10/2016 | Chen et al. |
| 9,513,814 B1 | 12/2016 | Can et al. |
| 9,529,545 B1 | 12/2016 | Bono et al. |
| 9,542,125 B1 | 1/2017 | Chen |
| 9,594,514 B1 | 3/2017 | Bono et al. |
| 9,684,593 B1 | 6/2017 | Chen et al. |
| 9,710,187 B1 | 7/2017 | Si et al. |
| 9,811,288 B1 | 11/2017 | Chen et al. |
| 9,817,768 B2 | 11/2017 | Si et al. |
| 10,037,369 B1 | 7/2018 | Bono et al. |
| 10,082,959 B1 | 9/2018 | Chen et al. |
| 10,095,428 B1 | 10/2018 | Meiri et al. |
| 10,152,381 B1 | 12/2018 | Shvaiger et al. |
| 10,176,046 B1 | 1/2019 | Hu et al. |
| 10,235,066 B1 | 3/2019 | Chen et al. |
| 10,248,623 B1 | 4/2019 | Chen et al. |
| 10,261,853 B1 | 4/2019 | Chen et al. |
| 10,310,951 B1 | 6/2019 | Chen et al. |
| 10,324,640 B1 | 6/2019 | Chen et al. |
| 10,338,861 B2 | 7/2019 | Kronrod et al. |
| 10,353,618 B2 | 7/2019 | Tao et al. |
| 10,359,968 B1 | 7/2019 | Chen et al. |
| 10,374,792 B1 | 8/2019 | Meiri et al. |
| 10,394,485 B1 | 8/2019 | Chen et al. |
| 10,402,283 B1 | 9/2019 | Chen et al. |
| 10,409,493 B1 | 9/2019 | Kucherov et al. |
| 10,459,632 B1 | 10/2019 | Chen et al. |
| 10,469,883 B2 | 10/2019 | Meiri et al. |
| 10,496,489 B1 | 12/2019 | Chen et al. |
| 10,496,668 B1 | 12/2019 | Meiri et al. |
| 10,496,672 B2 | 12/2019 | Meiri et al. |
| 10,565,058 B1 | 2/2020 | Meiri et al. |
| 10,613,793 B1* | 4/2020 | Hu .................... G06F 11/1446 |
| 2003/0158861 A1 | 8/2003 | Sawdon et al. |
| 2009/0070536 A1* | 3/2009 | Nasre .................. G06F 11/1464 711/E12.103 |
| 2013/0041985 A1* | 2/2013 | Christiansen ....... G06F 21/6218 709/219 |
| 2015/0026132 A1* | 1/2015 | Arnaudov ........... G06F 11/1453 707/639 |
| 2015/0378832 A1* | 12/2015 | Brown ................ G06F 11/2058 714/19 |
| 2017/0142093 A1 | 5/2017 | Oelke |
| 2018/0275923 A1 | 9/2018 | Earhart et al. |
| 2020/0228462 A1 | 7/2020 | Bohra |
| 2021/0278973 A1 | 9/2021 | Tsuchiya et al. |

OTHER PUBLICATIONS

U.S. Appl. No. 15/499,949, filed Apr. 28, 2017, Chen et al.
U.S. Appl. No. 15/499,951, filed Apr. 28, 2017, Chen et al.
U.S. Appl. No. 15/656,168, filed Jul. 21, 2017, Hu et al.
U.S. Appl. No. 15/656,170, filed Jul. 21, 2017, Chen et al.
U.S. Appl. No. 15/797,324, filed Oct. 30, 2017, Chen et al.
U.S. Appl. No. 16/042,363, filed Jul. 23, 2018, Chen et al.
U.S. Appl. No. 16/038,543, filed Jul. 18, 2018, Chen et al.
U.S. Appl. No. 16/048,767, filed Jul. 30, 2018, Chen et al.
U.S. Appl. No. 16/169,202, filed Oct. 24, 2018, Chen et al.
U.S. Appl. No. 16/177,782, filed Nov. 1, 2018, Hu et al.
U.S. Appl. No. 16/167,858, filed Oct. 23, 2018, Chen et al.
U.S. Appl. No. 16/175,979, filed Oct. 31, 2018, Hu et al.
U.S. Appl. No. 16/157,528, filed Oct. 11, 2018, Chen et al.
U.S. Appl. No. 16/162,786, filed Oct. 17, 2018, Hu et al.
U.S. Appl. No. 16/164,005, filed Oct. 18, 2018, Chen et al.
U.S. Appl. No. 16/264,825, filed Feb. 1, 2019, Chen et al.
U.S. Appl. No. 16/254,899, filed Jan. 23, 2019, Chen et al.
U.S. Appl. No. 16/254,897, filed Jan. 23, 2019, Chen et al.
U.S. Appl. No. 16/264,982, filed Feb. 1, 2019, Chen et al.
U.S. Appl. No. 16/263,414, filed Jan. 31, 2019, Meiri et al.
U.S. Appl. No. 16/375,001, filed Apr. 4, 2019 Chen et al.
U.S. Appl. No. 16/380,087, filed Apr. 10, 2019, Kronrod et al.
U.S. Appl. No. 16/592,271, filed Oct. 3, 2019, Chen et al.
U.S. Appl. No. 16/592,328, filed Oct. 3, 2019, Barabash et al.
U.S. Appl. No. 16/667,453, filed Oct. 29, 2019, Chen et al.
U.S. Appl. No. 16/668,661, filed Oct. 30, 2019, Kronrod et al.
U.S. Appl. No. 16/743,274, filed Jan. 15, 2020, Chen et al.
U.S. Appl. No. 16/747,169, filed Jan. 20, 2020, Chen et al.
U.S. Appl. No. 16/786,422, filed Feb. 10, 2020, Kronrod et al.
U.S. Appl. No. 16/788,461, filed Feb. 12, 2020, Chen et al.
U.S. Appl. No. 16/773,303, filed Jan. 27, 2020, Hu et al.
U.S. Appl. No. 16/511,676, filed Jul. 15, 2019, Chen et al.
Offloaded Data Transfer, Applies to Windows Server 2019 and 2016, Oct. 4, 2019, 11 pages.
U.S. Appl. No. 17/029,508, filed Sep. 23, 2020, Chen et al.
Response to U.S. Office Action dated Aug. 4, 2022 for U.S. Appl. No. 17/029,508; Response filed Sep. 6, 2022; 11 pages.
U.S. Office Action dated Aug. 4, 2022 for U.S. Appl. No. 17/029,508; 12 pages.
Notice of Allowance dated Dec. 5, 2022 for U.S. Appl. No. 17/029,508; 9 pages.

* cited by examiner

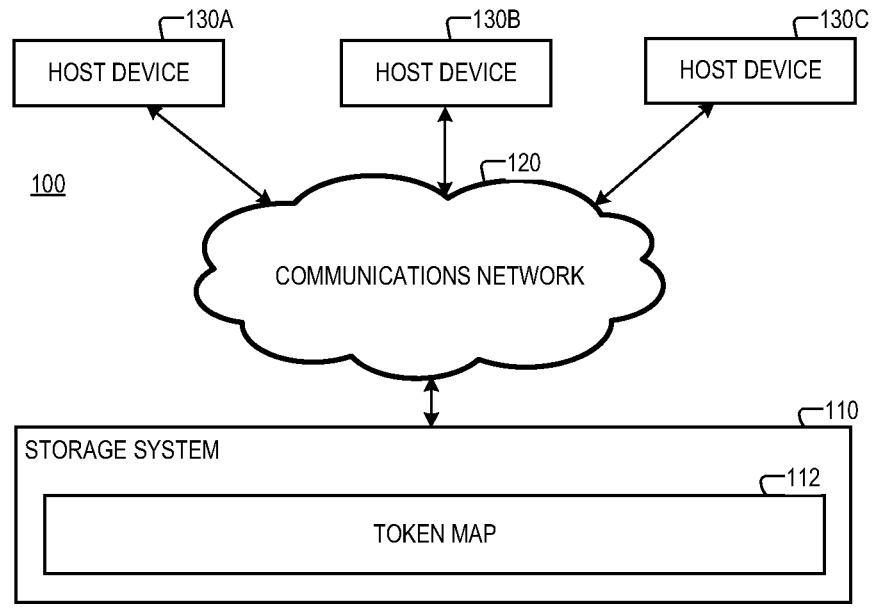
FIG. 1A
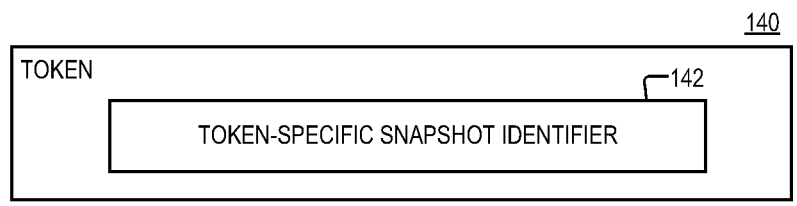
FIG. 1B
FIG. 1C

TOKEN-BASED OFFLOAD DATA TRANSFER WITH SYNCHRONOUS REPLICATION

BACKGROUND

A distributed storage system may include a plurality of storage devices (e.g., storage device arrays) to provide data storage to a plurality of nodes. The plurality of storage devices and the plurality of nodes may be situated in the same physical location, or in one or more physically remote locations. The plurality of nodes may be coupled to the storage devices by a high-speed interconnect, such as a switch fabric.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

According to aspects of the disclosure, a method is provided, comprising: receiving, at a source system, a first copy instruction, the first copy instruction being associated with a token that represents one or more data items, the first copy instruction instructing the source system to copy the one or more data items from a first volume to a second volume; detecting whether the source system is currently performing synchronous replication of the first volume and the second volume; when the source system is performing synchronous replication of both the first volume and the second volume: (i) retrieving one or more hash digests from a snapshot that is associated with the token, each of the one or more hash digests being associated with a different one of the one or more data items, (ii) transmitting, to a target system, a second copy instruction that is associated with the one or more hash digests, the second copy instruction instructing the target system to copy the one or more data items to a replica of the second volume that is stored at the target system, and (iii) copying the one or more data items from the first volume to the second volume; and when the source system is not performing synchronous replication of the second volume, copying the one or more data items from the first volume to the second volume.

According to aspects of the disclosure, a system is provided comprising: a memory that is configured to store a first volume and a second volume; and one or more processors that are operatively coupled to the memory, the one or more processors being configured to perform the operations of: receiving a first copy instruction, the first copy instruction being associated with a token that represents one or more data items, the first copy instruction instructing the one or more processors to copy the one or more data items from the first volume to the second volume; detecting whether each of the first volume and the second volume is currently a source for synchronous replication; when each of the first volume and the second volume is currently a source for synchronous replication: (i) retrieving one or more hash digests from a snapshot that is associated with the token, each of the one or more hash digests being associated with a different one of the one or more data items, (ii) transmitting, to a target system, a second copy instruction that instructs the target system to copy the one or more data items to a replica of the second volume that is stored at the target system, the second copy instruction being based on the one or more hash digests, and (iii) copying the one or more data items from the first volume to the second volume; and when the second volume is not a source for synchronous replication, copying the one or more data items from the first volume to the second volume.

According to aspects of the disclosure, a non-transitory computer-readable medium is provided that stores one or more processor-executable instructions, which, when executed by one or more processors, cause the one or more processors to perform the operations of: receiving a first copy instruction, the first copy instruction being associated with a token that represents one or more data items, the first copy instruction instructing a source system to copy the one or more data items from a first volume to a second volume; detecting whether the source system is currently performing synchronous replication of the first volume and the second volume; when the source system is performing synchronous replication of both the first volume and the second volume: (i) retrieving one or more hash digests from a snapshot that is associated with the token, each of the one or more hash digests being associated with a different one of the one or more data items, (ii) transmitting, to a target system, a second copy instruction that is associated with the one or more hash digests, the second copy instruction instructing the target system to copy the one or more data items to a replica of the second volume that is stored at the target system, and (iii) copying the one or more data items from the first volume to the second volume; and when the source system is not performing synchronous replication of the second volume, copying the one or more data items from the first volume to the second volume.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features.

FIG. 1A is a diagram of an example of a system, according to aspects of the disclosure;

FIG. 1B is a diagram of an example of a token map, according to aspects of the disclosure;

FIG. 1C is a diagram of an example of a token, according to aspects of the disclosure;

DETAILED DESCRIPTION

Figure 2A:
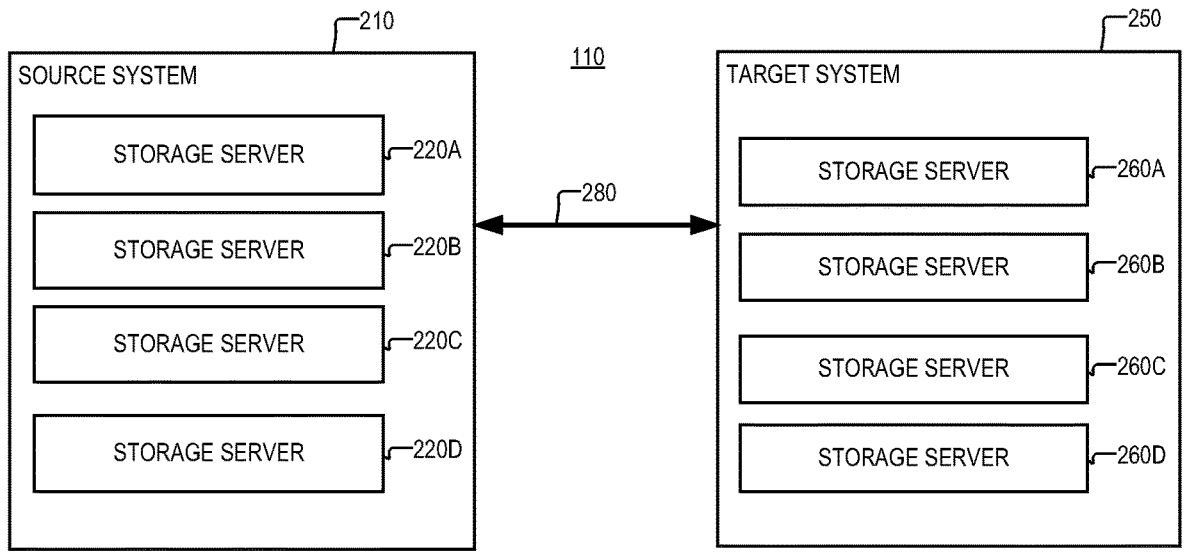
FIG. 2A is a diagram of an example of a storage system, according to aspects of the disclosure.

FIG. 1 is a diagram of an example of a system 100, according to aspects of the disclosure. The system 100 may include a storage system 110 that is coupled to one or more host devices 130 via a communications network 120. The storage system 110 may include a content-addressable storage system that is configured to retrieve and store data on one or more storage devices in response to I/O requests that are transmitted by the host devices 130. The communications network 120 may include a local area network (LAN), a wide area network (WAN), the Internet, and/or any or suitable type of communications network. Each of the host devices 130 may include a desktop computer, a laptop computer, a server, and/or any other suitable type of electronic device. Additionally or alternatively, each of the host devices 130 may include a file server, such as a Windows File Server™ or a Samba server, which is configured to provide an interface between the storage system 110 and client devices (or applications) that read and write data to the storage system 110.

According to the present disclosure, the storage system 110 is configured to support a token-based copy operation. The token-based copy operation may be one that allows data to be copied by using a token corresponding to the data. A token-based copy operation may be similar to a conventional copy operation in that both operations copy data from one location to another location. However, a token-based copy operation may identify (or reference) the data that is copied by using a token corresponding to the data, whereas a conventional copy operation may identify (or reference) the data by using one or more addresses where the data is stored.

To support token-based copy operations, the storage system 110 may be configured to provide an interface for the creation of tokens. According to the present disclosure, any of the host devices may submit to the storage system a request to create a token. The request may identify one or more addresses in the storage system 110 and/or one or more contiguous address ranges. The addresses specified by the request may be on the same volume and/or on different volumes. In response to the request, the storage system 110 may create a token representing the data stored at the specified addresses (and/or address ranges) and return the token to the host device.

According to the present disclosure, when the storage system 110 creates a token, the storage system preserves the data that is associated with the token. As noted above, to obtain a token from the storage system 110, any of the host devices may identify one or more addresses (or address ranges) where the data is stored. However, any token that is created by the storage system is associated with the data, rather than the addresses. If any of the addresses is overwritten with new data, the token will become invalid—unless the data is preserved. For this reason, when the storage system 110 creates a token, it also preserves the data that is represented by the token.

To preserve the data that is represented by the token, when the storage system 110 creates the token, it also creates a token-specific snapshot that is associated with the token. In some implementations, the token-specific snapshot may include a snapshot of the entire logical space of the source system 210. Additionally or alternatively, in some implementations, the token-specific snapshot may include a snapshot of a portion of the logical space of the storage system. Additionally or alternatively, in some implementations, the token-specific snapshot may be a snapshot of the entire volume where the data represented by the token is stored, and, as such, it may reference other data in addition to the data that is associated with the volume. In some implementations, the token-specific snapshot may be created at the time when the token is created. Additionally or alternatively, in some implementations, the token-specific snapshot may be created after the a request to create the token is received and before the execution of subsequent write requests (i.e., write requests that are received after the request to create the token), which require the overwriting of data that is stored at one or more addresses (or address ranges) that are associated with the request to create the token.

According to the present disclosure, the token-specific snapshots can be created by using existing means for snapshot creation. In this regard, the token-specific snapshot may be created by using the same services that are used by the storage system 110 to create conventional snapshots. Accordingly, the token-specific snapshots may be the same or similar to other snapshots that are created within the storage system 110 for the purpose of returning the storage system to a specific point in time. However, in some implementations, token-specific snapshots may have different access restrictions than conventional snapshots. Unlike conventional snapshots, which can be accessible for conventional (e.g., unmapped) read/write commands, the token-specific snapshots may be accessed only for the purpose of performing token-write operations (and/or other token-based operations).

In some respects, using token-specific snapshots to preserve data that is associated with created tokens is advantageous because the token-specific snapshots can be created very quickly in comparison to copying the data to a temporary location. According to the example of FIG. 1A, the storage system 110 is configured to store a token map 112, which maps tokens to the token's corresponding token-specific snapshots. As illustrated in FIG. 1B, the token map 112 may include a plurality of entries 122. Each entry 122 may include a token identifier 122A and an identifier 122B of a token-specific snapshot that corresponds to the token that is identified by the token identifier 122A. As can be readily appreciated, the token map 112 may be used by the storage system 110 (and/or one or more storage servers that are part of the storage system 110) to identify the respective token-specific snapshot that is associated with any token issued by the storage system 110.

Although in the example of FIGS. 1A-B a token map is used to relate tokens with their respective token-specific snapshots, the present disclosure is not limited thereto. For example, in some implementations, any token that is issued by the storage system 110 may include an identifier corresponding to the token-specific snapshot for that token. For instance, FIG. 1C depicts an example of a token 140, which is created by the storage system 110, and which includes an identifier 142 that identifies a token-specific snapshot that is created for the token 140 (to preserve data represented by the token). The identifier 142 may include any suitable number, string, or alphanumerical string that can be used by the storage system to retrieve the token-specific snapshot.

FIG. 2A is a diagram illustrating the storage system 110 in further detail, according to aspects of the disclosure. As illustrated, the storage system 110 may include a source system 210 that is coupled to a target system 250 via a network 280. The network 280 may include a TCP/IP network, an InfiniBand network, and/or any other suitable type of communications network. The source system 210 may include a plurality of storage servers 220 (e.g., storage servers 220A-D), and the target system 250 may include a plurality of storage servers 260 (e.g., storage servers 260A-D). In some implementations, any of the storage servers 220 and 260 may be the same or similar to the server 300, which is discussed further below with respect to FIG. 3. Although not shown, each of the source system 210 and the target system 250 may be arranged to use a different storage device array, such as the storage device array 410, which is discussed further below with respect to FIG. 4.

The storage system 110 may be configured to perform synchronous data replication. Performing synchronous replication by the storage system 110 (or source system 210) may include transmitting replication data from any of the storage servers 220 to any of the storage servers 260. The replication data may be associated with I/O requests that are received at the storage system 110. In some implementations, the I/O requests may not be completed (and/or acknowledged) by the storage system 110 unless the synchronous replication of the I/O requests is completed successfully. In other words, synchronous replication may be performed in-line (and concurrently) with incoming I/O requests. Synchronous replication can be distinguished from asynchronous replication, which is performed periodically (as opposed to in-line with incoming I/O requests), and in accordance with specified recovery point objectives (RPOs).

Figure 2B:
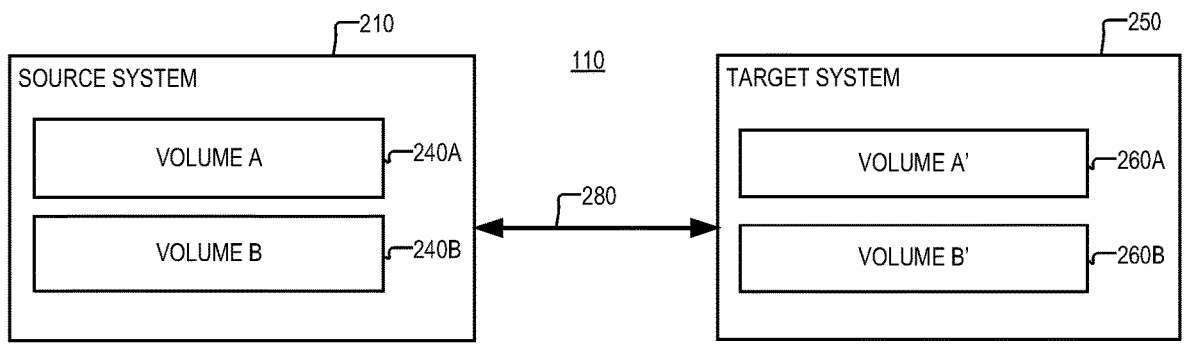
FIG. 2B is a diagram illustrating an aspect of the operation of the storage system of FIG. 2A, according to aspects of the disclosure.

FIG. 2B is a diagram illustrating the operation of the storage system 110, according to aspects of the disclosure. As illustrated, the source system 210 may store a volume 240A and a volume 240B. The source system may include a volume 260A and a volume 260B. Volume 260A may be a replica of the volume 240A and volume 260B a replica of the volume 240B. According to the present example, volumes 260A and 260B are maintained via synchronous replication. It will be understood that the present disclosure is not limited to any specific method for performing synchronous replication. Examples concerning the generation of replication data are discussed in further detail in U.S. Pat. No. 10,310,951, titled Storage System Asynchronous Data Replication Cycle Trigger with Empty Cycle Detection, and U.S. Pat. No. 10,324,640, titled Storage System with Consistent Initiation of Data Replication Across Multiple Distributed Processing Modules, both of which are herein incorporated by reference in their entirety.

Figure 3:
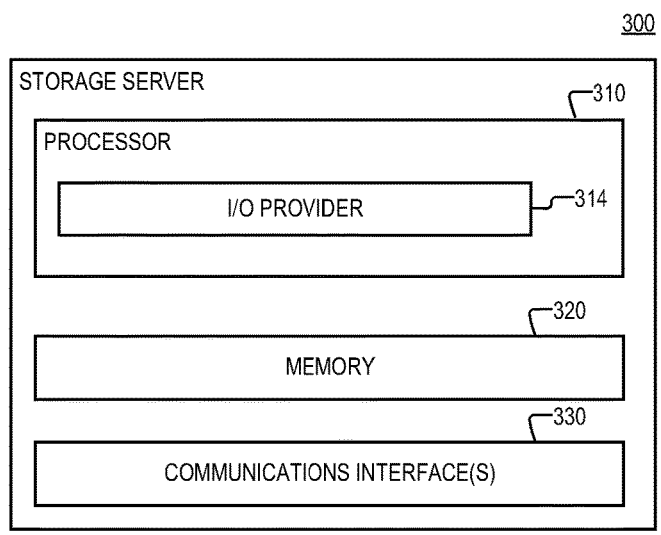
FIG. 3 is a diagram of an example of a storage server, according to aspects of the disclosure.

FIG. 3 is a diagram of an example of a server 300, according to aspects of the disclosure. As illustrated, the storage server 220 may include a processor 310, a memory 320, and a communications interface(s) 330. The processor 310 may include any of one or more general-purpose processors (e.g., x86 processors, RISC processors, ARM-based processors, etc.), one or more Field Programmable Gate Arrays (FPGAs), one or more application-specific circuits (ASICs), and/or any other suitable type of processing circuitry. The memory 320 may include any suitable type of volatile and/or non-volatile memory. In some implementations, the memory 320 may include one or more of a random-access memory (RAM), a dynamic random memory (DRAM), a flash memory, a hard drive (HD), a solid-state drive (SSD), a network accessible storage (NAS), and or any other suitable type of memory device. The communications interface(s) 330 may include any suitable type of communications interface, such as one or more Ethernet adapters, one or more Wi-Fi adapters (e.g., 802.1414 adapters), and one or more Long-Term Evolution (LTE) adapters, for example. According to the present example, the processor 310 may be configured to execute an I/O provider 314. The I/O provider 314 may include one or more processes for executing incoming I/O requests (e.g., write requests). The I/O provider 314 is discussed further below with respect to FIG. 4.

Figure 4:
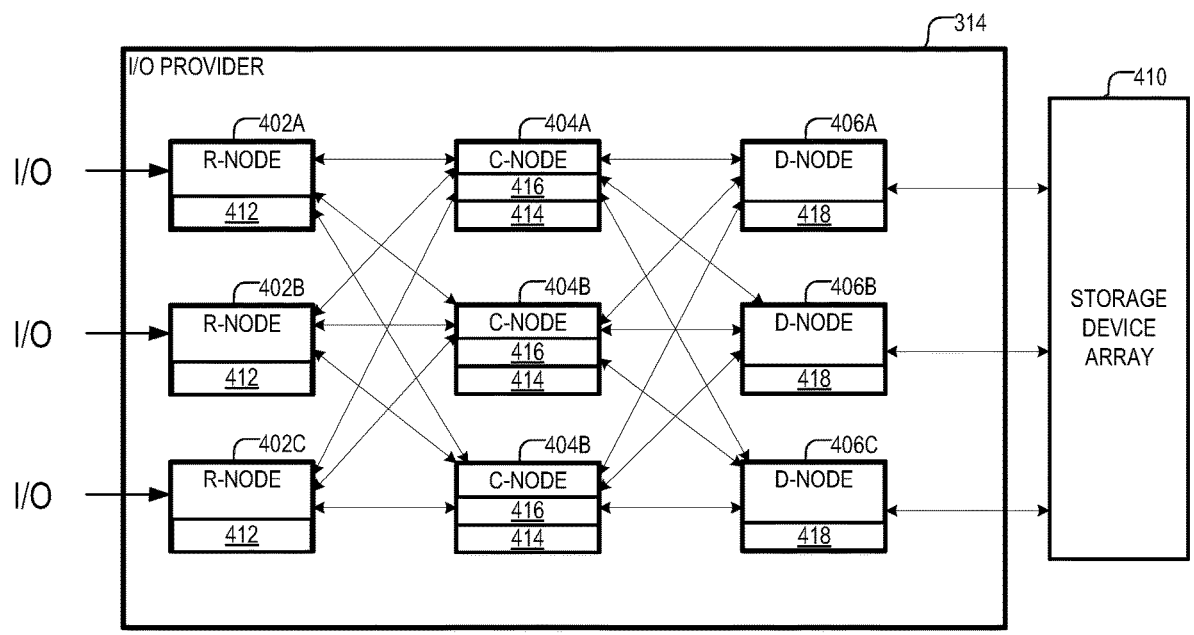
FIG. 4 is a diagram of an example of an I/O provider, according to aspects of the disclosure.

FIG. 4 is a diagram illustrating an example of one implementation of the I/O provider 314. According to the present example, the I/O provider 314 includes nodes 402, 404, and 406, which are herein referred to as routing nodes (R-nodes), control nodes (C-nodes), and data nodes (D-nodes) respectively. According to the present example, the I/O provider 314 is configured store and retrieve data from a storage device array 410. The storage device array 410 may include a Redundant Array of Independent Disks (RAID) or any other suitable type of storage device array. The storage device array 410 may include one or more a solid-state drive (SSD), a hard disk (HD), a non-volatile random-access memory (nvRAM) device, and/or any other suitable type of storage device.

The routing nodes 402 may be configured to terminate Read/Write commands received at the storage system 110 and route them to appropriate control nodes 404 and data nodes 406 for further execution. In doing so, the routing nodes 402 may distribute a workload over multiple control nodes 404 and data nodes 406. In some implementations, any of the routing nodes 402 may be configured to write I/O requests (e.g., SCSI I/O requests) to selected ones of the control nodes 404 for further processing. In some implementations, each of the routing nodes 402 may be provided with a respective address-to-control-module (A2C) table 412 that identifies a plurality of control nodes (e.g., the control nodes 404) and a different respective LDA range that is managed by each of the control nodes. In this regard, the A2C table 412 may define a plurality of logical spaces that are managed by different control nodes 404. In the present example, a copy of the A2C table 412 is stored on each of the routing nodes 402. However, it will be understood that the present disclosure is not limited to any specific method for allocating respective logical spaces to the control nodes 404.

The control nodes 404 may be configured to control the execution of control node commands supplied by the routing nodes 402. The control node commands may be used to implement read requests, write requests, and/or any other suitable I/O request. In addition, each of the control nodes 404 may maintain and manage key metadata elements. Each of the control nodes 404 may be configured to receive control node commands from the routing nodes and communicate with the data nodes 406 to execute the commands. In some implementations, each control node 404 may maintain an address-to-hash (A2H) table 414 and a hash-to-D-node (H2D) table 416. As is known in the art, the A2H table may map different logical data addresses (LDAs) to respective hash digests of user data that is stored at the LDAs, and the H2D table may map each of the hash digests to a respective data node 406.

The data nodes 406 may be configured to control the execution of data node commands supplied by the control nodes 404. Each of the data nodes 406 may be attached to one or more of the storage devices in the storage device array 410. Each of the data nodes may store in memory a hash-to-physical-address (H2P) table 418. The H2P table 418 may identify a plurality of physical addresses in the storage device array 410, and different respective hash digest that is mapped to each of the physical addresses.

As noted above, the tables 412-418 may map each of a plurality of logical addresses to a corresponding physical address in the storage device array 410. As can be readily appreciated, using the tables 412-418 enables the storage system 110 to eliminate duplicate copies of repeating data. In particular, the use of the tables 412-418 permits the same physical address in the storage device array 410 to be mapped to multiple LDAs in the storage system 110. When a read request is received for any of these LDAs, the tables 412-418 can be used to identify the physical address that is mapped to the LDA and return the data item that is stored at the physical address. This feature is commonly referred to as "data deduplication."

As noted above, in some implementations, the server 300 may be the same or similar to any of the storage servers 260 of the target system 250 (see FIG. 2A). In such implementations, the storage device array 410 may be part of the target system 250, a first LDA that is identified in the A2H table 414 may be part of the volume 260A and a second LDA may be part of the volume 260B. If any node in the storage system 110 wanted to copy a data item that is stored at the first LDA (of the volume 260A) to the second LDA (of the volume 260B), the copying of the data item may be effectuated by simply modifying the A2H table 414 to map the second LDA to the same physical address (in the storage device array 410) as the first LDA. In other words, the copying of data between volumes 260A and 260B can be performed by metadata manipulation, without performing a new write of the data to the storage device array 410.

As noted above, in some implementations, the server 300 may be the same or similar to any of the storage servers 220 of the source system 210 (see FIG. 2A). In such implementations, the storage device array 410 may be part of the source system 210, a first LDA that is identified in the A2H table 414 may be part of the volume 240A and a second LDA may be part of the volume 240B. If any node in the storage system 110 wanted to copy a data item that is stored at the first LDA (of the volume 240A) to the second address (of the volume 240B), the copying of the data item may be effectuated by simply modifying the A2H table 414 to map the second LDA to the same physical address (in the storage device array 410) as the first LDA. In other words, the copying of data between volumes 240A and 240B can also be performed by metadata manipulation, without any physical movement of the data.

Figure 5A:
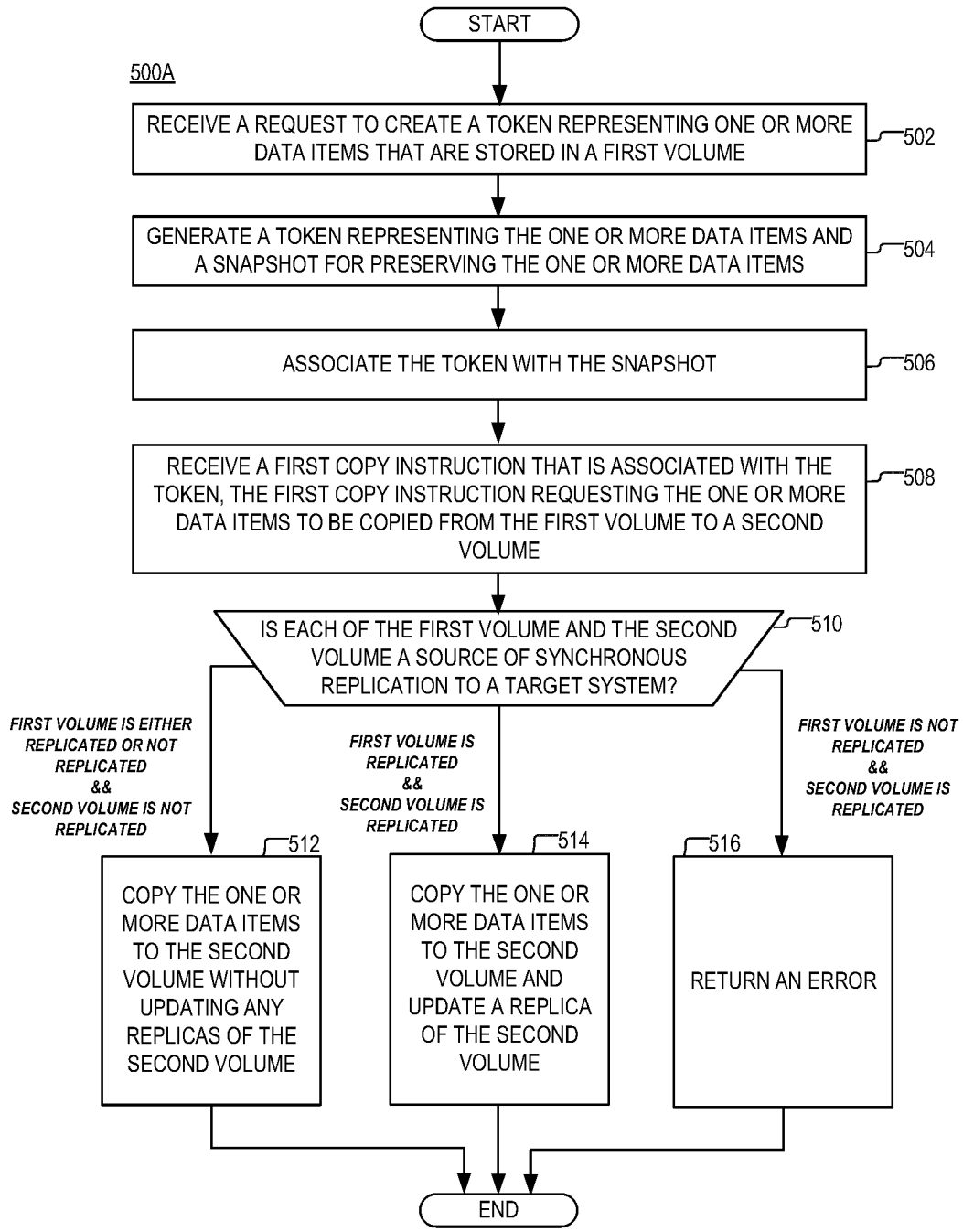
FIG. 5A is a flowchart of an example of a process, according to aspects of the disclosure.

FIG. 5A is a flowchart of an example of a process 500A, according to aspects of the disclosure.

At step 502, a source system receives a request to create a token representing one or more data items. The one or more data items are stored in a first volume. However, alternative implementations are possible in which the request is associated with data items that are stored on different volumes. The request identifies one or more addresses (or address ranges) where the one or more data items are stored. In some implementations, the source system may be the same or similar to the source system 210, which is discussed above with respect to FIGS. 2A-B. In some implementations, the first volume may be the same or similar to the volume 210A, which is discussed above with respect to FIGS. 2A-B. In some implementations, the first instruction may be received from a host device, such as any of the host devices 130, which are discussed above with respect to FIG. 1.

At step 504, the source system generates the token and a snapshot for preserving the one or more data items that are represented by the token. In some implementations, the snapshot may be a token-specific snapshot. Additionally or alternatively, in some implementations, the snapshot may include a snapshot of the first volume. Additionally or alternatively, in some implementations, the snapshot may include a snapshot of multiple volumes or a portion of the volume. Stated succinctly, the present disclosure is not limited to any specific type of snapshot being used to preserve the data that is represented by the token.

At step 506, the source system associates the token with the snapshot. Associating the snapshot with the token may include any suitable action that causes the snapshot to be retrievable (and/or identifiable) based on the token and/or an identifier corresponding to the token. In some implementations, associating the token with the snapshot may include updating a data structure, such as the token map 112 (see FIG. 1A), to map the token to the snapshot. Additionally or alternatively, in some implementations, associating the token with the snapshot may include inserting an identifier corresponding to the snapshot into the token. Although steps 504 and 506 are described as separate operations, in some implementations, the association of the token with the snapshot may be performed as part of the generation of the token.

At step 508, the source system receives a first copy instruction that is associated with the token. The first copy instruction instructs the source system to copy the one or more data items that are represented by the token from a first volume to a second volume. In some implementations, the first copy instruction may be a token-based copy instruction, such as a token-based write, an Offloaded Data Transfer (ODX) instruction, a token-based offload write instruction, and/or any other suitable type of token-based instruction. In some implementations, the instruction may include (or otherwise reference) the token. In some implementations, the first instruction may be received from the same host device that issued the request to create the token. In some implementations, both the first volume and the second volume may be stored at the source system. Additionally or alternatively, in some implementations, the second volume may be the same or similar to the volume 240B, which is discussed above with respect to FIGS. 2A-B. According to the example of FIG. 5A, the first copy instruction requires the copying of all data items that are represented by the token. However, alternative implementations are possible in which the first copy instruction requires the copying of fewer than all of the data items. According to the present example, each of the data item includes a page. However, the present disclosure is not limited to any specific unit of data.

At step 510, the source system detects whether each of the first volume and the second volume is a source of synchronous replication. In some implementations, determining whether the first volume is a source of synchronous replication may include detecting whether the first volume is being currently replicated (e.g., replicated when the first copy request is received) to a target system, via synchronous replication. In some implementations, determining whether the second volume is a source of synchronous replication may include detecting whether the second volume is being currently replicated (e.g., replicated when the first copy request is received) to the target system, via synchronous replication. In some implementations, the source system may detect whether the first volume or the second volume is a source of synchronous replication by examining one or more configuration settings of the source system. In some implementations, the target system may be the same or similar to the target system 250, which is discussed above with respect to FIGS. 2A-B. Additionally or alternatively, in some implementations, the source system and the target system may be part of a content-addressable storage system.

If the second volume is currently replicated to a target system via synchronous replication, the process 500A proceeds to step 512. Otherwise, if both the first volume and the second volume are currently replicated to the target system via synchronous replication, the process 500A proceeds to step 514. And if the first volume is not currently replicated (via synchronous replication), while the second volume is replicated (via synchronous replication), the process 500A proceeds to step 516.

At step 512, the source system copies the one or more data items that are represented by the token from the first volume to the second volume, without updating any replicas of the second volume that may be maintained at the target system (e.g., asynchronous replicas). In some implementations, the copying may be performed by modifying an A2H table of the source system, in the manner discussed above with respect to FIG. 4. However, it will be understood that the present disclosure is not limited to any specific method for copying the one or more data items from the first volume to the second volume.

At step 514, the source system copies the one or more data items that are represented by the token from the first volume to the second volume and updates a synchronous replica of the second volume, that is stored at the target system, to include the one or more data items. In some implementations, the replica of the second volume may be the same or similar to the volume 250B, which is discussed above with respect to FIG. 2B. The manner in which step 514 is performed is discussed further below with respect to FIG. 5B.

At step 516, the source system transmits an error to the sender of the first copy instruction (e.g., a host device), which indicates that the first copy instruction cannot be completed successfully. In response to the error, the sender of the first copy instruction may re-attempt to copy the one or more data items (represented by the token) to the second volume via conventional write operations. Although not shown in FIG. 5A, if any of steps 512 and 514 fails to be completed successfully, the source system may also return an error to the sender. However, if any of steps 512 and 514 is completed successfully, the source system may return an acknowledgment, which indicates that the first copy instruction has been executed successfully.

Figure 5B:
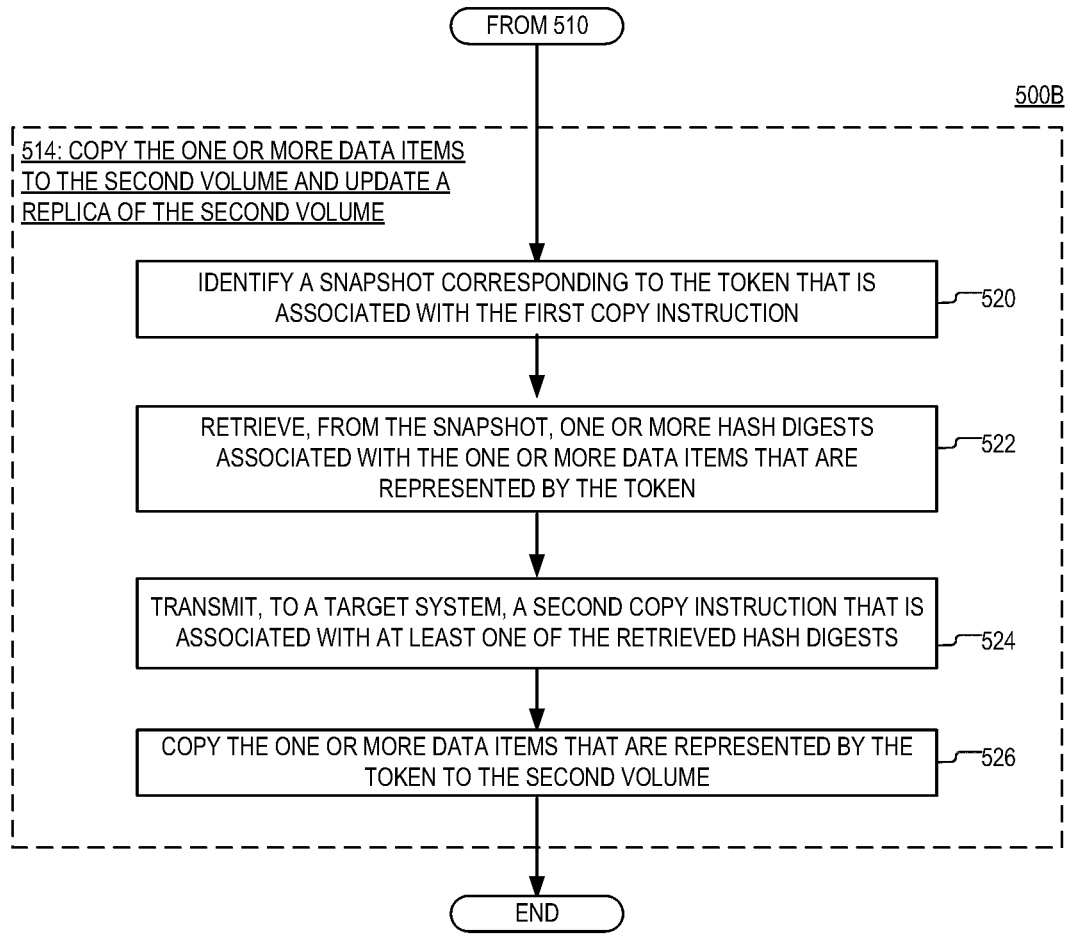
FIG. 5B is a flowchart of an example of a process, according to aspects of the disclosure.

FIG. 5B is a flowchart of an example of process 500B for copying the one or more data items to a second volume and updating a replica of the second volume to include the one or more data items, as specified by step 514 of the process 500A.

At step 520, the source system identifies a snapshot corresponding to the token that is associated with the first copy instruction (received at step 508). As noted above, the snapshot associated with the first copy instruction may be the snapshot created at step 504. In some implementations, the snapshot may be identified by performing a search of a data structure that maps tokens to their associated token-based snapshots. The data structure may be the same or similar to the token map 112, which is discussed above with respect to FIGS. 1A-B. Additionally or alternatively, in some implementations, identifying the snapshot may include retrieving an identifier corresponding to the snapshot. The identifier may be retrieved from the token. Stated succinctly, the present disclosure is not limited to any specific method for identifying the snapshot that is assonated with the token.

At step 522, the source system retrieves one or more hash digests from the snapshot (identified at step 520). Each of the retrieved hash digests corresponds to a different one of the data items that are represented by the token. As noted above, the snapshot may be a snapshot of an entire volume and, therefore, it may also include hash digests of data items that are not represented by the token. According to the present example, each of the retrieved hash digests is a long hash digest. However, it will be understood that the present disclosure is not limited to any specific type of hash digest being retrieved from the snapshot. According to the example of FIG. 5B, the source system retrieves the respective hash digest of each data item that is represented by the token. However, alternative implementations are possible in which the source system retrieves the respective hash digests of fewer than all data items that are represented by the token.

At step 524, the source system transmits to the target system a second copy instruction. The second copy instruction may instruct the target system to copy all of the data items that are represented by the token to the replica of the second volume that is maintained at the target system. In some implementations, the second instruction may include (or otherwise reference) each of the hash digests retrieved at step 522. Additionally or alternatively, in some implementations, the second copy instruction may be a write via full hash command. The manner in which the second copy instruction is executed by the second target system is discussed further below with respect to FIG. 6. In the example of FIG. 5B one second copy instruction is transmitted for all of the hash digests retrieved at step 522 (or for all data items that are represented by the token). However, alternative implementations are possible in which multiple second copy instructions are transmitted to the token, wherein each of the second copy instruction is associated with different hash digest(s) (and/or different data item(s)) that are represented by the token.

At step 526, the source system copies one or more data items (which are represented by the token) from the first volume to the second volume. In some implementations, the copying may be performed by modifying an A2H table of the source system, in the manner discussed above with respect to FIG. 4. However, it will be understood that the present disclosure is not limited to any specific method for copying the one or more data items from the first volume to the second volume.

Figure 6:
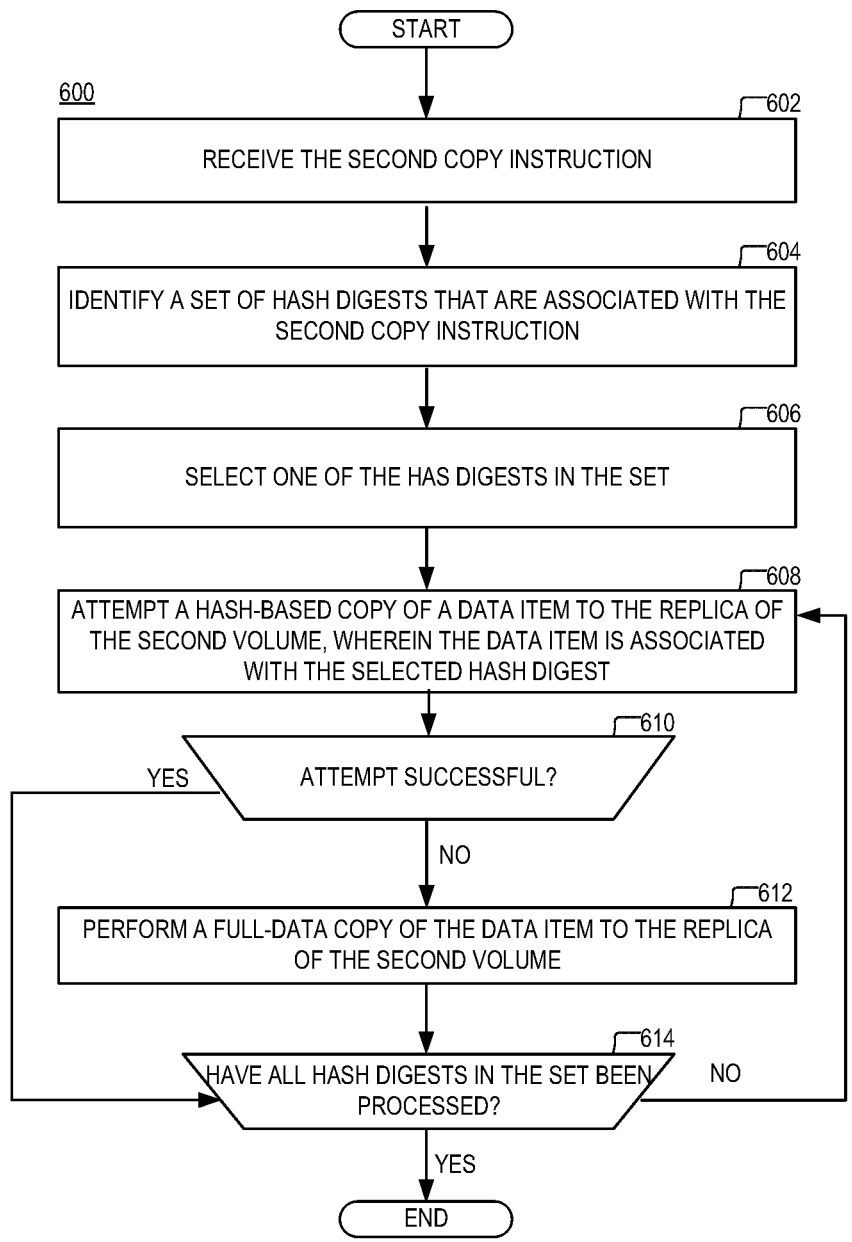
FIG. 6 is a flowchart of an example of a process, according to aspects of the disclosure.

FIG. 6 is a flowchart of an example of a process 600 for executing the second copy instruction that is transmitted at step 526 of the process 500B. According to the present example, the process 600 is executed by the target system, which is discussed above with respect to FIGS. 5A-B.

At step 602, the target system receives the second copy instruction.

At step 604, the target system identifies a set of hash digests that are included in or otherwise referenced by the second copy instruction. As noted above, the set of hash digests may include one or more hash digests. Each of the hash digests may be associated with a data item that is represented by the token (i.e., the token associated with the first copy instruction that is received at step 508 of the process 500A). According to the present example, a hash digest is associated with a data item if the hash digest is generated based on the data item.

At step 606, the target system selects one of the hash digests in the set (identified at step 604).

At step 608, the target system attempts to copy a data item that is associated with the hash digest (selected at step 606) to the replica of the second volume. More particularly, the target system attempts to execute a hash-based copy operation for copying the data item to the replica of the second volume. In some implementations, the hash-based copy operation may include a write via full hash operation. Additionally or alternatively, in some implementations, the hash-based copy operation may include any operation that results in the data item being copied to the replica of the second volume via metadata manipulation (i.e., without moving the data item to a new physical location in the storage device array that is used to implement the replica of the second volume).

As noted above, step 514 (and/or the process 600) is executed when the target system includes both a replica of the first volume and a replica of the second volume. Since the target system includes a replica of the first volume, and the data item is already stored in the first volume, the data item is also stored in the replica of the first volume (at the target system). Furthermore, because the target system is a content-addressable system, the target system may copy the data item to the second volume by updating the A2H table of the target system to map an LDA in the replica of the second volume to the physical location (in a storage device array of the target system), where the data item is already stored.

At step 610, step the target system detects if the attempt to copy the data item to the replica of the second volume via a hash-based copy operation is successful. If the attempt is successful, the process proceeds to step 614. Otherwise, if the attempt is not successful, the process 600 proceeds to step 612.

At step 612, the target system executes a full-data copy operation for copying the data item to the replica of the second volume. Executing the full-data copy operation may include retrieving the data item based on the hash digest (selected at step 606) and storing the data item at another (or new) physical location in the storage device array of the target system. In some implementations, the data item may be retrieved from the source system. Additionally or alternatively, is implementations, the data item may be retrieved from the replica of the first volume that is maintained at the target system. Additionally or alternatively, in some implementations, the full-data copy operation may include a full-page data transfer operation.

At step 614, the target system determines whether there are any hash digests left in the set (identified at step 604) that remain to be processed. If there are hash digests that remain to be processed, the process 600 returns to step 606, and another hash digest is selected. Otherwise, if each of the hash digests has already been selected once (at step 606), the process ends. In some implementations, each of the hash digests in the set may be selected only once (at step 606) during the execution of the process 600.

According to aspects of the disclosure, the technique described with respect to FIGS. 5A-6 is advantageous because it may avoid host IO latency hiccups during token creation, while also reducing token management overhead in the target system. An alternative to the technique described with respect to FIGS. 5A-6 would be to create an identical snapshot pair when a token is created (e.g., a pair of identical token-specific snapshots, where one of the snapshots is created at the source system and the other one is created at the target system). Afterwards, when the token is used to execute a token-based copy operation, the token-based copy operation may be executed concurrently at the source system (by using one of the snapshots in the pair) and at the target system (by using the other one of the snapshots in the pair). This approach, however, may introduce significant host IO latency hiccups, as host I/Os need to be suspended and drained during the creation of identical snapshot pairs, which could last a few seconds.

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing and claiming the invention and are not intended to limit the claims in any way. Such terms do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Although the subject matter described herein may be described in the context of illustrative implementations to process one or more computing application features/operations for a computing application having user-interactive components the subject matter is not limited to these particular embodiments. Rather, the techniques described herein can be applied to any suitable type of user-interactive component execution management methods, systems, platforms, and/or apparatus.

While the exemplary embodiments have been described with respect to processes of circuits, including possible implementation as a single integrated circuit, a multi-chip module, a single card, or a multi-card circuit pack, the described embodiments are not so limited. As would be apparent to one skilled in the art, various functions of circuit elements may also be implemented as processing blocks in a software program. Such software may be employed in, for example, a digital signal processor, micro-controller, or general-purpose computer.

Some embodiments might be implemented in the form of methods and apparatuses for practicing those methods. Described embodiments might also be implemented in the form of program code embodied in tangible media, such as magnetic recording media, optical recording media, solid-state memory, floppy diskettes, CD-ROMs, hard drives, or any other machine-readable storage medium, wherein, when the program code is loaded into and executed by a machine, such as a computer, the machine becomes an apparatus for practicing the claimed invention. Described embodiments might also be implemented in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the claimed invention. When implemented on a general-purpose processor, the program code segments combine with the processor to provide a unique device that operates analogously to specific logic circuits. Described embodiments might also be implemented in the form of a bitstream or other sequence of signal values electrically or optically transmitted through a medium, stored magnetic-field variations in a magnetic recording medium, etc., generated using a method and/or an apparatus of the claimed invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments.

As used throughout the disclosure, the term "storage system" may refer to one or more of: (i) a distributed storage system including a source system and a target system, (ii) the target system, or (iii) the source system.

Also, for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts which have been described and illustrated in order to explain the nature of the claimed invention might be made by those skilled in the art without departing from the scope of the following claims.

The invention claimed is:

1. A method comprising:
receiving, at a source system, a first copy instruction, the first copy instruction including or referencing a token that represents one or more data items, the token containing an identifier of a token-specific snapshot that is arranged to preserve the one or more data items, the first copy instruction instructing the source system to copy the one or more data items from a first volume to a second volume;
detecting whether the source system is currently performing synchronous replication of the first volume and the second volume;
when the source system is performing synchronous replication of both the first volume and the second volume: (i) identifying the token-specific snapshot, (ii) retrieving one or more hash digests from the token-specific snapshot, each of the one or more hash digests being associated with a different one of the one or more data items, (iii) transmitting, to a target system, a second copy instruction that is associated with the one or more hash digests, the second copy instruction instructing the target system to copy the one or more data items to a replica of the second volume that is stored at the target system, and (iv) copying the one or more data items from the first volume to the second volume; and
when the source system is not performing synchronous replication of the second volume, copying the one or more data items from the first volume to the second volume,
wherein the token-specific snapshot is created in response to a request to create the token for the purpose of preserving the one or more data items that are represented by the token, the token-specific snapshot being created before the first copy instruction is received,
wherein the source system and the target system are part of a storage system, and the token-specific snapshot is subject to one or more policies in the storage system that limit access to the token-specific snapshot to accesses that are performed for a purpose of performing token-based operations, and
wherein the storage system is configured to create a snapshot of the first volume that corresponds to unmapped read or write commands, and which is subject to different access restrictions than the token-specific snapshot, the snapshot that corresponds to unmapped read or write commands being different from the token-specific snapshot.

2. The method of claim 1, further comprising, when the source system is performing synchronous replication of the second volume, but not of the first volume, returning an error.

3. The method of claim 1, wherein the source system and the target system are part of a content-addressable storage system.

4. The method of claim 1, wherein the first copy instruction includes a token-based copy instruction, and the second copy instruction includes a write via full hash instruction.

5. The method of claim 1, further comprising:
receiving the second copy instruction at the target system; and
copying each of the one or more data items to the replica of the second volume based on the one or more hash digests that are retrieved from the token-specific snapshot.

6. The method of claim 5, wherein copying any of the one or more data items includes:
attempting to execute a hash-based write of the data item to the replica of the second volume; and
copying the data item to the replica of the second volume via a full data transfer if the hash-based write fails.

7. A system comprising:
a memory that is configured to store a first volume and a second volume; and
one or more processors that are operatively coupled to the memory, the one or more processors being configured to perform the operations of:
receiving a first copy instruction, the first copy instruction including or referencing a token that represents one or more data items, the token containing an identifier of a token-specific snapshot that is arranged to preserve the one or more data items, the first copy instruction instructing the one or more processors to copy the one or more data items from the first volume to the second volume;
detecting whether each of the first volume and the second volume is currently a source for synchronous replication;

when each of the first volume and the second volume is currently a source for synchronous replication: (i) identifying the token-specific snapshot that corresponds to the token, (ii) retrieving one or more hash digests from the token-specific snapshot, each of the one or more hash digests being associated with a different one of the one or more data items, (iii) transmitting, to a target system, a second copy instruction that instructs the target system to copy the one or more data items to a replica of the second volume that is stored at the target system, the second copy instruction being based on the one or more hash digests, and (iv) copying the one or more data items from the first volume to the second volume; and when the second volume is not a source for synchronous replication, copying the one or more data items from the first volume to the second volume, wherein the token-specific snapshot is created in response to a request to create the token for the purpose of preserving the one or more data items that are represented by the token, the token-specific snapshot being created before the first copy instruction is received, wherein the system and the target system are part of a storage system, and the token-specific snapshot is subject to one or more policies in the storage system that limit access to the token-specific snapshot to accesses that are performed for a purpose of performing token-based operations, and wherein the storage system is configured to create a snapshot of the first volume that corresponds to unmapped read or write commands, and which is subject to different access restrictions than the token-specific snapshot, the snapshot that corresponds to unmapped read or write commands being different from the token-specific snapshot.

8. The system of claim 7, the one or more processors are further configured to perform the operation of returning an error, when only the second volume is a source of synchronous replication.

9. A non-transitory computer-readable medium storing one or more processor-executable instructions, which, when executed by one or more processors, cause the one or more processors to perform the operations of:
receiving a first copy instruction, the first copy instruction including or referencing a token that represents one or more data items, the token containing an identifier of a token-specific snapshot that is arranged to preserve the one or more data items, the first copy instruction instructing a source system to copy the one or more data items from a first volume to a second volume;
detecting whether the source system is currently performing synchronous replication of the first volume and the second volume;
when the source system is performing synchronous replication of both the first volume and the second volume: (i) identifying the token-specific snapshot, (ii) retrieving one or more hash digests from the token-specific snapshot, each of the one or more hash digests being associated with a different one of the one or more data items, (iii) transmitting, to a target system, a second copy instruction that is associated with the one or more hash digests, the second copy instruction instructing the target system to copy the one or more data items to a replica of the second volume that is stored at the target system, and (iv) copying the one or more data items from the first volume to the second volume; and when the source system is not performing synchronous replication of the second volume, copying the one or more data items from the first volume to the second volume, wherein the token-specific snapshot is created in response to a request to create the token for the purpose of preserving the one or more data items that are represented by the token, the token-specific snapshot being created before the first copy instruction is received, wherein the source system and the target system are part of a storage system, and the token-specific snapshot is subject to one or more policies in the storage system that limit access to the token-specific snapshot to accesses that are performed for a purpose of performing token-based operations, and wherein the storage system is configured to create a snapshot of the first volume that corresponds to unmapped read or write commands, and which is subject to different access restrictions than the token-specific snapshot, the snapshot that corresponds to unmapped read or write commands being different from the token-specific snapshot.

10. The non-transitory computer-readable medium of claim 9, wherein the one or more processor-executable instructions, when executed by the one or more processors, further cause the one or more processors to perform the operation of returning an error when only the second volume is a source of synchronous replication.

11. The non-transitory computer-readable medium of claim 9, wherein the source system and the target system are part of a content-addressable storage system.

12. The non-transitory computer-readable medium of claim 9, wherein the first copy instruction includes a token-based copy instruction, and the second copy instruction includes a write via full hash instruction.

13. The non-transitory computer-readable medium of claim 9, wherein the one or more processor-executable instructions, when executed by the one or more processors, further cause the one or more processors to perform the operation of executing the second copy instruction by copying each of the one or more data items to the replica of the second volume based on the one or more hash digests that are retrieved from the token-specific snapshot.

14. The non-transitory computer-readable medium of claim 13, wherein copying any of the one or more data items includes:
attempting to execute a hash-based write of the data item to the replica of the second volume; and
copying the data item to the replica of the second volume via a full data transfer if the hash-based write fails.

15. The method of claim 1, wherein the token is included in the first copy instruction.

16. The system of claim 7, wherein the token is included in the first copy instruction.

17. The non-transitory computer-readable medium of claim 9, wherein the token is included in the first copy instruction.

18. The method of claim 1, wherein the token-specific snapshot is identified by retrieving the identifier of the token-specific snapshot from the token.

19. The method of claim 1, wherein the token-specific snapshot is created contemporaneously with the token.

* * * * *